US005478099A

United States Patent [19]
Kawahara

[11] Patent Number: 5,478,099
[45] Date of Patent: Dec. 26, 1995

[54] BICYCLE WHEEL FORK ASSEMBLY

[75] Inventor: Fumio Kawahara, Shizuoka, Japan

[73] Assignee: Showa Corporation, Gyoda, Japan

[21] Appl. No.: 475,789

[22] Filed: Jun. 7, 1995

Related U.S. Application Data

[63] Continuation of Ser. No. 209,976, Mar. 11, 1994, abandoned.

[30] Foreign Application Priority Data

Mar. 18, 1993 [JP] Japan .................................. 5-082469

[51] Int. Cl.$^6$ ............................................. B62K 25/08
[52] U.S. Cl. .................................. 280/276; 280/283
[58] Field of Search ............................... 280/275, 276, 280/283, 284, 279

[56] References Cited

U.S. PATENT DOCUMENTS

| | | | |
|---|---|---|---|
| 4,807,860 | 2/1989 | Simons | 280/276 X |
| 4,971,344 | 11/1990 | Turner | 280/276 |
| 5,275,264 | 1/1994 | Isella | 280/276 X |

FOREIGN PATENT DOCUMENTS

| | | | |
|---|---|---|---|
| 0508134 | 10/1992 | European Pat. Off. | 280/276 |
| 0240391 | 9/1989 | Japan | 280/276 |
| 2231289 | 9/1990 | Japan . | |
| 0300536 | 12/1990 | Japan | 280/276 |
| 8803493 | 5/1988 | WIPO | 280/279 |

*Primary Examiner*—Margaret A. Focarino
*Assistant Examiner*—Victor E. Johnson
*Attorney, Agent, or Firm*—Dvorak and Traub

[57] ABSTRACT

A bicycle wheel suspension is disclosed, which comprises two front fork assemblies capable of being elongated and contracted, each having an inner and an outer tube and slidable relative to each other. The lower ends of these front fork assemblies can support an axle. The front fork assemblies include respective attenuating mechanisms and. The attenuating mechanism in one front fork assembly can adjust the attenuating force during the contraction stroke of this front fork assembly. The attenuating mechanism in the other front fork assembly can adjust the attenuating force during the elongation stroke of this front fork assembly.

13 Claims, 5 Drawing Sheets

BICYCLE WHEEL FORK ASSEMBLY

This application is a continuation of application Ser. No. 08/209,976, filed Mar. 11, 1994 now abandoned.

FIELD OF THE INVENTION

The present invention relates to a bicycle wheel suspension and, more particularly, to a bicycle wheel suspension which is capable of adjusting attenuating forces of front fork assemblies.

BACKGROUND ART

Prior art off-road bicycles include one in which the front wheel is supported by a front wheel suspension having a buffering mechanism and an attenuating mechanism, as disclosed in Japanese Patent Laid-Open Publicaiton H2-231289. This front wheel suspension comprises a steering bracket rotatably supported in a front portion of the bicycle frame, and a pair of front fork assemblies coupled together by the steering bracket. Each of the front fork assemblies includes an inner tube and an outer tube, which are slidable relative to each other. In these tubes, an oil chamber and a gas chamber are formed. Gas in the gas chamber functions as a buffering mechanism, and the oil chamber is provided with an attenuating mechanism.

With this prior art front wheel suspension, when the front fork assemblies are elongated and contracted by impact forces transmitted from the front wheel, the gas in the gas chambers in the front fork assemblies functions to absorb the impact forces, while attenuating forces that are generated as the oil in the oil chambers flowing through the attenuating mechanisms suppress the elongating or contracting motion of the front fork assemblies to suppress vibrations.

In the above prior art front wheel suspension, it is desirable to permit adjustment of the attenuating forces of the attenuating mechanisms in order to provide for a desired level of comfort depending upon the taste or weight of the individual driver.

However, if it is intended to permit adjustment of the attenuating forces for both the contraction and elongation of the front fork assemblies, the number of components is increased, and the construction of the attenuating mechanisms becomes complicated. Particularly, in a light weight bicycle, the diameter of the front fork assemblies is small, and it is thus difficult from the design standpoint to permit adjustment of the attenuating forces of the attenuating mechanisms for both the elongation and contraction of the front fork assemblies.

DISCLOSURE OF THE INVENTION

The invention contemplates the above drawbacks inherent in the prior art, and its object is to provide a bicycle wheel suspension which permits the adjustment of attenuating forces in its elongation and contraction without complicating the construction of the attenuating mechanisms.

According to the invention, there is provided a bicycle wheel suspension comprising a pair of fork assemblies capable of being elongated and contracted, each including an inner tube and an outer tube, these tubes being slidable relative to each other. The lower ends of the fork assemblies are capable of supporting an axle, one of the fork assemblies including an attenuating mechanism constructed to permit adjustment of the attenuating force during its contraction stroke, the other one of the fork assemblies including another attenuating mechanism constructed such as to permit adjustment of the attenuating force during its elongation stroke.

If an attenuating mechanism provided in a single fork assembly is constructed such as to permit attenuating force adjustment in both the cases of contraction and elongation of this fork assembly, the number of components of the attenuating mechanism increases, and the attenuating mechanism becomes complicated.

With the bicycle wheel suspension according to the invention, the attenuating mechanism in one of the fork assemblies permit adjustment of the attenuating force while this fork assembly is contracted, while the attenuating mechanism in the other fork assembly permits adjustment of the attenuating force while its own fork assembly is elongated. It is thus possible to obtain attenuating force adjustment in both the cases of contraction and elongation of the wheel suspension as a whole without complicating the construction of the attenuating mechanisms of the individual fork assemblies.

BRIEF DESCRIPTION OF THE DRAWINGS

The present invention will be more fully understood from the detailed description given below and from the accompanying drawings which should not be taken to be a limitation on the invention, but for explanation and understanding only.

The drawings.

DETAILED DESCRIPTION OF THE PREFERRED EMBODIMENT

An embodiment of the invention will be described with reference to the drawings.

Figure 2:
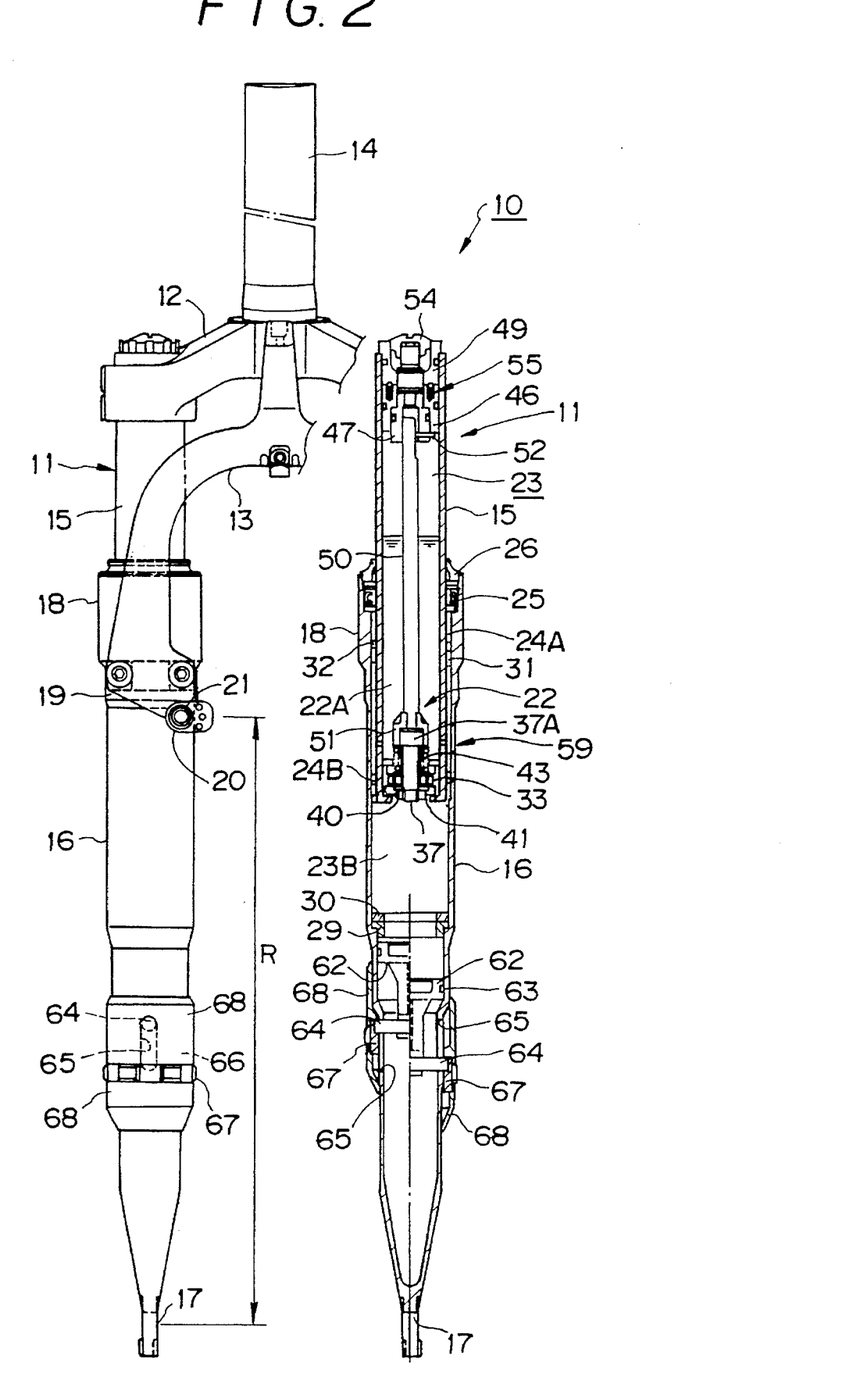
FIG. 2 is a front view, partly broken away, showing a front fork incorporating an embodiment of the bicycle front wheel suspension according to the invention.

As shown in FIG. 2, a front fork, generally designated at 10 as the front wheel suspension, comprises two front fork assemblies 11 which are coupled together by a steering bracket 12 and a cross member 13. The lower end of each front fork assembly 11 supports the axle of the front wheel (not shown). The steering bracket 12 has a steering shaft 14 which is supported rotatably on a head pipe (not shown) of the bicycle frame for steering. A handle bar (not shown) is secured to the upper end of the steering shaft 14.

Each of the front fork assemblies 11 includes an inner and an outer tube 15 and 16, these tubes being slidably coupled together for elongation and contraction. The lower end of the outer tube 16 has an axle support section 17 which supports the axle of the front wheel. The inner tube 15 is coupled to the steering bracket 12 with its upper end inserted in a hole formed in the steering bracket 12 and secured to the bracket by a bolt.

Figure 3:
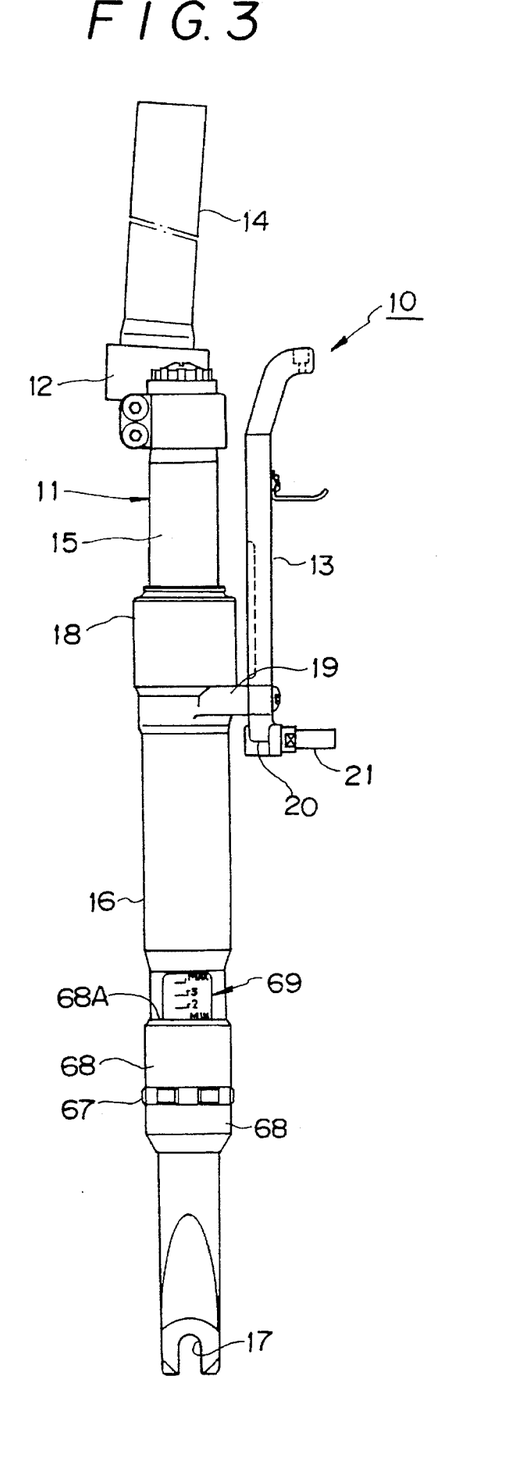
FIG. 3 is a sectional view showing the front fork shown in FIG. 2.

The outer tubes 16 each have an upper end increased diameter portion 18, and also have a cross member holder 19 under the increased diameter portion, as shown in FIG. 3. A U-shaped cross member 13 is mounted in the cross member holders 19 of the two front fork assemblies 11. The cross member makes up for insufficient rigidity of the front fork due to the fact that each front fork assembly 11 comprises two divisions, i.e., the inner and outer tubes 15 and 16. In addition, when braking the bicycle, it supports brake reaction forces exerted via brake holders 21.

The opposite ends of the cross member 13 each have an integral brake mounting boss 20 which projects from a location at a distance corresponding to the front wheel radius R from an axle support 17. A brake holder 21 is mounted on the brake mounting boss 20. A brake bar (not shown) provided with a brake pad (not shown), is rotatably supported by the brake holder 21.

Figure 1:
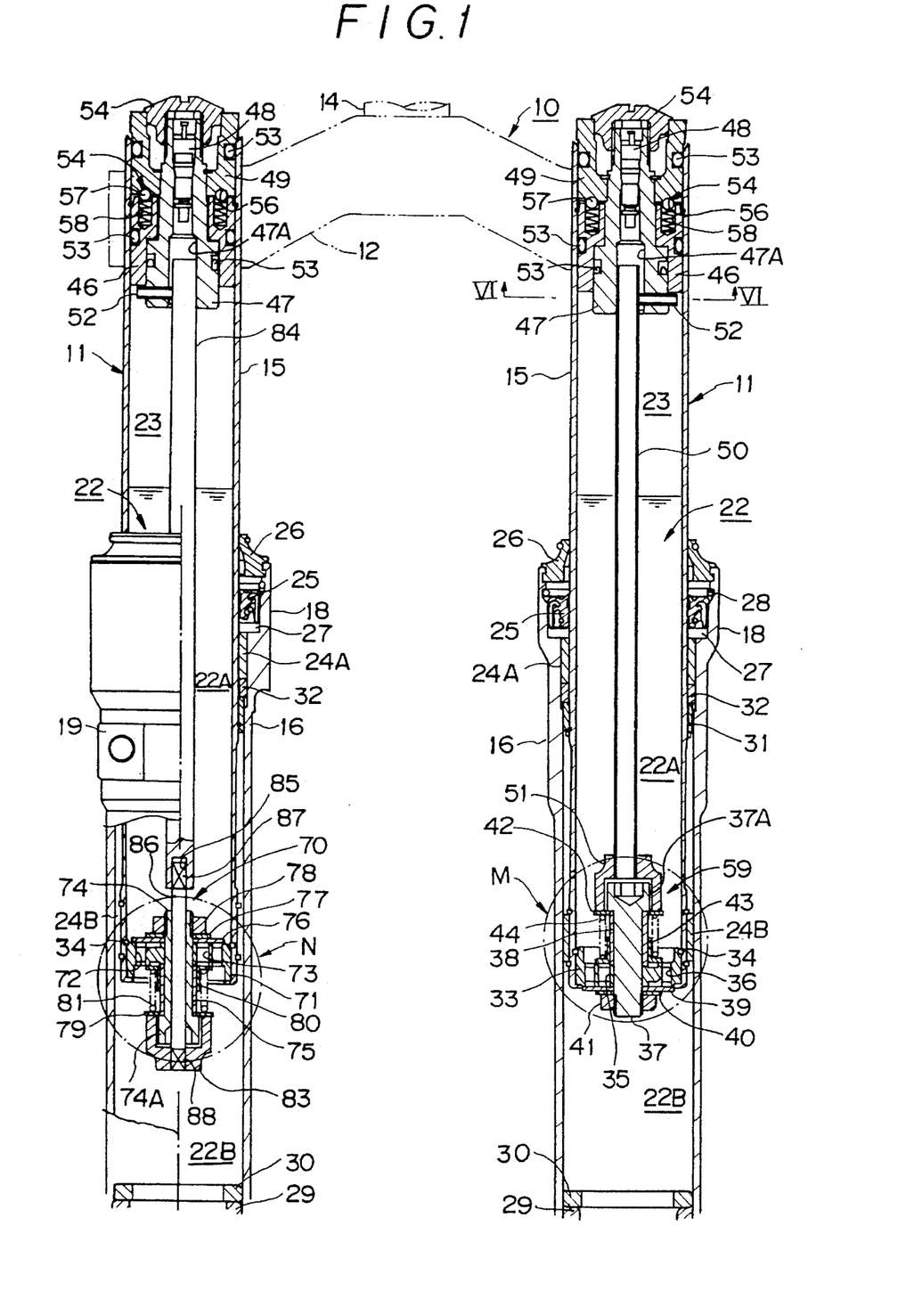
FIG. 1 is a sectional view showing part of FIG. 2 on an enlarged scale.

As shown in FIG. 1, in each front fork assembly 11, an oil chamber 22 filled with oil and an air or gas chamber 23 are formed in the inner and outer tubes 15 and 16. The oil chamber 22 is divided by a piston 33 into an upper and a lower oil chamber 22A and 22B. The bottom of the oil chamber 22 is defined by a partitioning wall member 62, and the top of the air chamber 23 is defined by a closing member 46 and a valve case 47.

An upper guide bush 24A is pressure fitted in the inner periphery of an upper portion of the outer tube 16. The inner periphery of the upper guide bush 24A is in frictional contact with the outer periphery of the inner tube 15. A lower guide bush 24B is provided on the outer periphery of the lower end of the inner tube 15 such that it is in frictional contact with the inner periphery of the outer tube 16. With the mutual frictional contact of the upper and lower guide bushes 24A and 24B, the outer tube 16 is slidable along the inner tube 15.

An oil seal 25 and a dust seal 26 are mounted in the inner periphery of the increased diameter portion 18 of the outer tube 16. The oil seal 25 is held in position by a seal spacer 27 and a seal stopper ring 28. The seal spacer 27 prevents oil leakage, and the dust seal 26 prevents intrusion of contaminant such as dust and mud.

A bottom metal member 29 is pressure fitted in the outer tube 16 substantially at an axially central position thereof. A bump rubber 30 is provided on the upper end of the bottom metal member 29. The inner tube 15 has an inwardly bent lower end portion. This inwardly bent lower end portion is in contact with the bottom metal member 29 via the bumper 30 to define the end of the contraction stroke of the front fork assembly 11. A rebound element 32 is fitted in the inner periphery of an upper end portion of the outer tube 16 in a lower portion of the upper guide bush 24A. The end of the elongation stroke of the front fork assembly 11 is defined as the lower guide bush 24B strikes the rebound element 32 via a rebound seat 31.

Figure 4A:
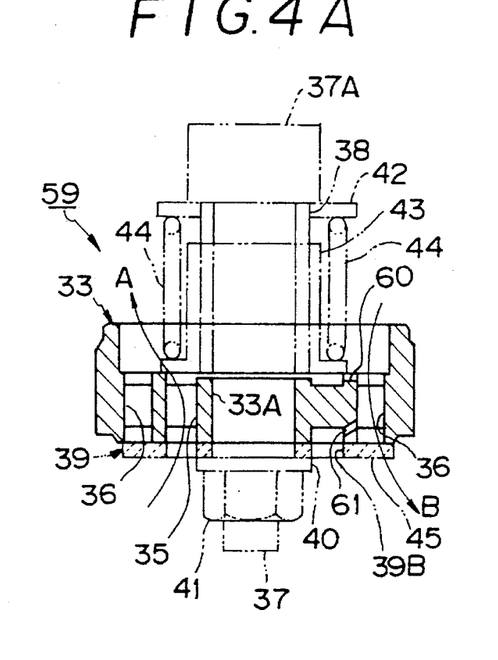
FIG. 4A is a sectional view, on an enlarged scale, showing a piston of FIG. 1.
Figure 4B:
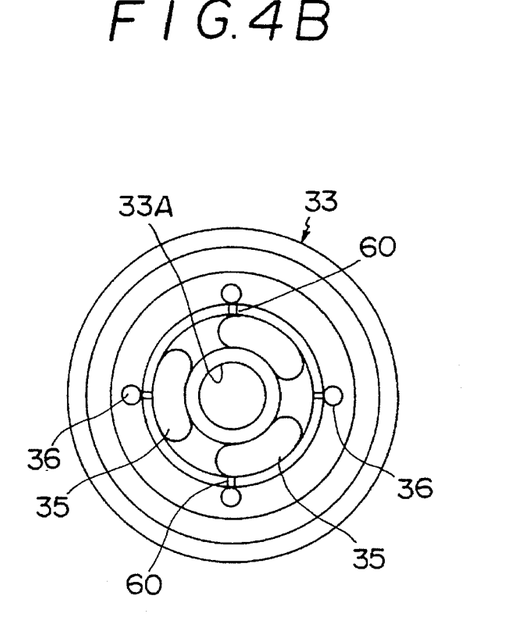
FIG. 4B is a plan view showing the piston of portion M shown in FIG. 1.

The piston 33 in the fight side front fork assembly 11, shown in FIG. 1, is disposed in a lower end portion of the inner tube 15, and is held in position by the curved lower end portion of the inner tube 15 and a stopper ring 34. As shown in FIGS. 4A and 4B, the piston 33 has a central bore 33A, around which are formed contraction side flow paths 35, around which are formed in turn, elongation side flow paths 36. The contraction side flow paths 35 are arcuate in shape. In this example, three contraction side flow paths 35 are provided around the central bore 33A. The elongation side flow paths 36 are circular in shape. In this example, four elongation side flow paths 35 are provided around the three contraction side flow paths 35.

A bolt 37, which may be a solid cylindrical shape, is inserted in the central bore 33A of the piston 33. A collar 38 is fitted on the bolt 37 between the head 37A thereof and the piston 33. A second valve 39 and a valve retainer 40 are fitted on an end portion of the bolt 37, and a clamp nut 41 is fitted on the end of the bolt 37. The bolt 37, collar 38, second valve 39 and valve retainer 40 are integral with the piston 33.

A spring receptacle 42 and a first valve 43 are fitted on the outer periphery of the collar 38 for movement in the axial direction of the collar 38. A valve spring 44 is interposed between the spring receptacle 42 and first valve 43. The valve spring 44 can close the contraction side flow paths 35, as shown in FIG. 4A.

In the contraction stroke of the right side front fork assembly as shown in FIG. 1, the outer tube 16 is moved upward in FIG. 1 by an impact force from the front wheel. At this time, the pressure in the lower oil chamber 22B is increased to open the first valve 43 against the biasing force of the valve spring 44, thus causing oil in the lower oil chamber 22B to travel through the contraction side flow paths 35 to the upper oil chamber 22 as shown by arrow A in FIG. 4A. As a result, air in the air chamber 23 functioning as a buffering mechanism is compressed, thus absorbing the impact force noted above with pneumatic spring reaction force. At this time, the attenuating force is generated in the piston 33 by a resistance against flow while oil flows through the contraction side flow paths 35. The piston 33, along with the first and second valves 43 and 39, functions as an attenuating mechanism 59.

Figure 5:
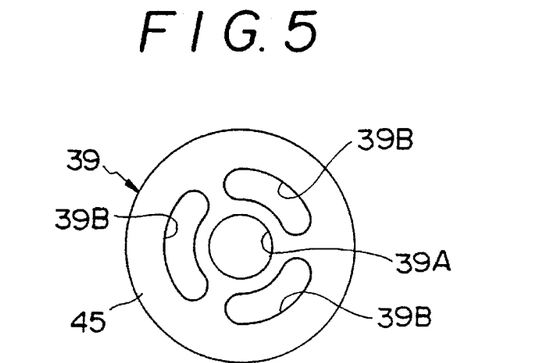
FIG. 5 is a plan view showing a second valve of FIG. 1.

The second valve 39, as shown in FIG. 5, has a central hole 39A and arcuate holes 39B formed therearound. As shown in FIG. 4A, the arcuate holes 39B are formed such that they correspond to the contraction side flow paths 35 in the piston 33 in the mounted state of the second valve 39. In the mounted state of the second valve 39, an outer ting-like portion 45 can close the elongation side flow paths 36 of the piston 33.

Thus, when a negative pressure is produced in the lower oil chamber 22B during the elongation stroke of the tight side front fork assembly 11 shown in FIG. 1, the second valve 39 is deformed by flexing to open the elongation side flow paths 36, thus allowing oil in the upper oil chamber 22A to flow through the elongation side flow paths 36 to the lower oil chamber 22B as shown by arrow B in FIG. 4A. At this time, an attenuating force is generated by the flow resistance against the flow of oil through the elongation side flow paths 36. The attenuating forces that are generated while the right side front fork assembly 11 is elongated and contracted, tend to suppress the elongating or contracting motion of the right side front fork assembly 11.

Further, as shown in FIGS. 4A and 4B, the piston 33 is formed with either slits 60 or orifices 61. With these slits 60 and/or orifices 61, the contraction and elongation side flow paths 35 and 36 are in communication with one another at all times, thus permitting the right side front fork assembly 11 to be moved without resistance for elongation and contraction.

As shown in FIG. 1, a closing member 46 is fitted in the inner periphery of an upper portion of the inner tube 15, and a valve case 47 is rotatably fitted in the closing member 46. The valve case 47 accommodates an air or gas valve 48, and on its outer periphery is fitted an adjusting sleeve 49 for rotation in unison.

Figure 6:
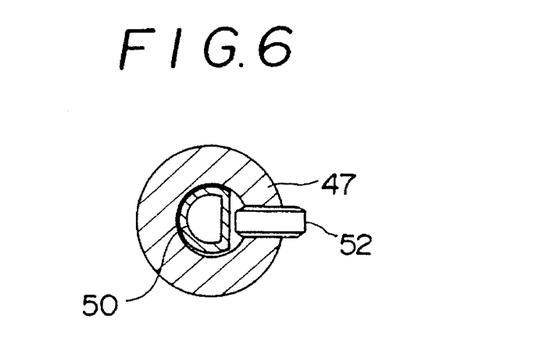
FIG. 6 is a sectional view taken along line VI—VI in FIG. 1.

An adjusting rod 50 has one end portion inserted in a central hole 47A of the valve case 47 and another end portion pressure fitted in an adjusting nut 51. The adjusting rod 50 has one end having a crescent sectional profile as shown in FIG. 6, and is coupled by a coupling pin 52 to the valve case 47 for rotation in unison with and movement in the axial direction of the valve case 47. The adjusting nut 51 is screwed on the outer periphery of the head 37A of the bolt 37, and its end is in contact with the spring receptacle 42.

Thus, by rotating the adjusting sleeve 49, the adjusting nut 51 is rotated via the valve case 47 and adjusting rod 50. The adjusting nut 51 thus moves the spring receptacle 42 in the axial direction of the bolt 37. As a result, the initial pressure applied from the valve spring 44 to the first valve 43 is changed. In this way, the amount of oil that flows through the contraction side flow paths 35, while the right side front fork assembly 11 shown in FIG. 1 is contracted, is controlled for adjusting the contraction side attenuating force of the right side front fork assembly 11.

O-rings 53 are fitted on the outer periphery of the closing member 46 and adjusting sleeve 49, thus maintaining the air chamber 23 gas tight. Air is supplied to the air chamber 23 through the air valve 48 and central bore 47A. A valve cap 54 is mounted at the upper end of the valve case 47 accommodating the air valve 48.

A click rotation mechanism 55 is provided between the abutting surfaces of the closing member 46 and adjusting sleeve 49. The click rotation mechanism 55 includes a plurality of recesses 56 formed in a circumferential arrangement in the lower end face of the adjusting sleeve 49, and a plurality of balls 57 provided on the top surface of the closing member 46 such that they are biased by a spring 58. As the adjusting sleeve 49 is rotated, the balls 57 are intermittently engaged in the recess 56, such that the adjusting sleeve 49 is rotated by click rotation.

The partitioning wall member 62 which defines the lower end of the oil chamber 22 in the fight and left sides front fork assemblies 11, shown in FIG. 1, is movable in a lower portion of the outer tube 16 in the axial direction thereof. An O-ring 63 is fitted on the outer periphery of the partitioning wall member 62 to maintain the interface between the partitioning wall member 62 and outer tube 16 liquid tight. An operating pin 64 is engaged as an operating member in the partitioning wall member 62. The operating pin 64 extends in a direction perpendicular to the axis of the outer tube 16, and penetrates a slot 65 formed therein. The slot 65, as shown in FIG. 2, extends in the axial direction of the outer tube 16.

The outer tube 16 has a thread 66 formed in its outer periphery in an area in which the slot 65 is formed. An adjusting ring 67 is screwed, as an adjusting member, on the thread 66. The adjusting ring 67 is movable in the axial direction of the outer tube 16. The end of the movable pin 64 can movably strike and be locked by the adjusting ring 67. By moving the adjusting ring 67 in the axial direction of the outer tube 16 via the thread 66, the position of the partitioning member 62 is changed to change the level of the oil head in the upper oil chamber 22A so as to change the initial volume of the air chamber 23, thus permitting adjustment of the pneumatic spring reaction force in the gas chamber 23.

A dust cover 68 is fitted on the adjusting ring 67 to cover the slot 65 and thread 66 in the outer tube 16. Further, as shown in FIG. 3, the outer tube 16 has a scale 69 formed on its lower portion, and the upper end 68A of the dust cover 68 serves as a pointer with respect to the scale 69 to indicate the position of the partitioning member 62.

In the attenuating mechanism 70 of the left side front fork assembly 11 shown in FIG. 1, the piston 71 has the same shape, but is inverted up-side down with respect to the piston 33 in the attenuating mechanism 59 in the right side front fork assembly 11, and is disposed in an end portion of the inner tube 15. In the piston 71, as shown in FIG. 7, contraction side flow paths 72 are formed as elongation side flow paths 36 in the piston 33, and elongation side flow paths 73 as contraction side flow paths 35 of the piston 33.

In the central bore 71A of the piston 71, a hollow cylindrical bolt 74 is inserted. A collar 75 is fitted on the bolt 74 between the lower face of the piston 71 and the bolt head 74A. A second valve 76 and a valve retainer 77 are fitted on an upper portion of the piston 71. A clamp nut 78 is screwed on the end of the bolt 74 and is made integral with the piston 71 via the collar 75, second valve 76, valve retainer 77 and bolt 74.

A spring receptacle 79 and a first valve 80 are slidably fitted on the outer periphery of the collar 75, and a valve spring 81 is interposed between the spring receptacle 79 and first valve 80. The first valve 80 can close the elongation side flow paths 73, and the second valve 76 can close the contraction side flow paths 72.

Figure 7:
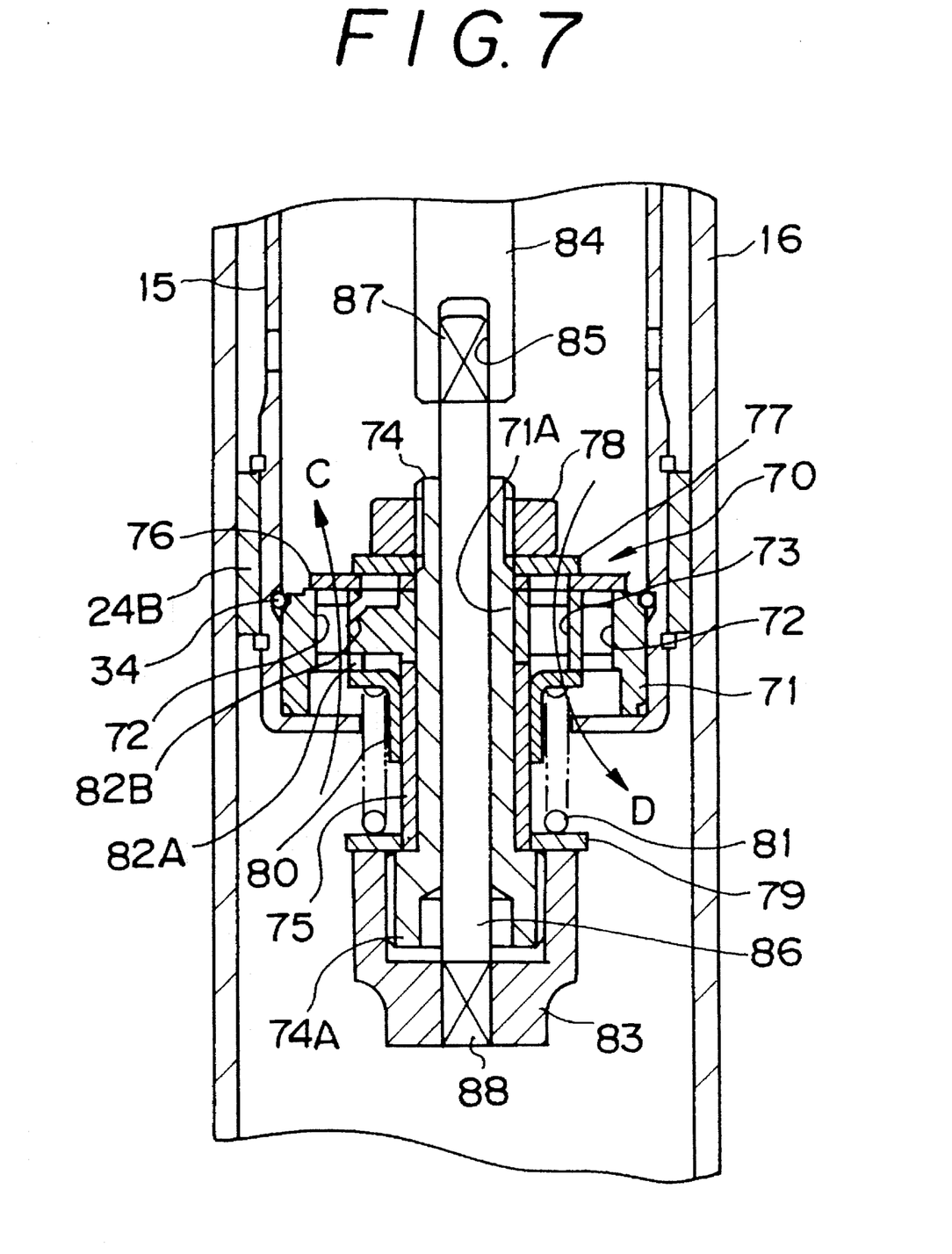
FIG. 7 is a sectional view, on an enlarged scale, showing portion N shown in FIG. 1.

When the left side front fork assembly 11 is contracted, the second valve 76 is opened to cause flow of oil through the contraction side flow paths 72 in the direction of arrow C in FIG. 7. The resistance offered to the oil flow generates an attenuating force while the left side front fork assembly 11 is contracted. When the left side front fork assembly 11 is elongated, the first valve 80 is opened to cause oil flow through the elongation side flow paths 73 in the direction of arrow D in FIG. 7. The resistance against the oil flow generates an attenuating force while the left side front fork assembly 11 is elongated.

The collar 75, second valve 76, valve retainer 77, spring receptacle 79, first valve 80, and valve spring 81, noted above, are the same shape, respectively, as the collar 38, second valve 39, valve retainer 40, spring receptacle 42, first valve 43, and valve spring 44 in the attenuating mechanism 59 of the fight side front fork assembly 11. The piston 71 has slits 82A and/or orifices 82B, which are the same shape as and have the same functions as the slits 60 and orifices 61 of the piston 33. An adjusting nut 83 is screwed on the head 74A of the bolt 74 such that its end is in contact with the spring receptacle 79. This adjusting nut 83 also has substantially the same shape as the adjusting nut 51 in the right side front fork assembly 11.

A first adjusting rod 84 is coupled by a coupling pin 52 to the central hole 47A of the valve case 47 in the left side front fork assembly 11 shown in FIG. 11. The first adjusting rod 84 is coupled to the valve case 47 such that it is rotatable in unison therewith, and is movable in the axial direction of the first adjusting rod 84.

A second adjusting rod 86 has an upper engagement portion pressure fitted in an engagement hole 85 formed in a lower end portion of the first adjusting rod 84, for rotation in unison. This second adjusting rod 86 extends through the bolt 74 and has its lower end portion fitted in the adjusting nut 83 for rotation in unison.

By causing rotation of the adjusting sleeve 49 of the left side front fork assembly 11, the first and second adjusting rods 84 and 86 are rotated in unison with each other via the valve case 47, thus rotating the adjusting nut 83 to displace the spring receptacle 79 in the axial direction of the bolt 74. As a result, the initial pressure acting on the first valve 80 from the valve spring 81 is changed. In this way, the amount of oil that flows through the elongation side flow paths 73 when the left side front fork assembly 11 is elongated, is controlled to adjust the attenuating force while the left side front fork assembly 11 is elongated.

In this embodiment, in the attenuating mechanism 59 in the right side front fork assembly 11, the attenuating force during the contraction stroke of the fight side front fork assembly can be adjusted by changing the initial pressure acting on the first valve 43 from the valve spring 44 by using the adjusting sleeve 49, valve case 47, adjusting rod 50 and adjusting nut 51. Also, in the attenuating mechanism 70 of the left side front fork assembly 11, the attenuating force during the elongation stroke of the left side front fork assembly 11 can be adjusted by changing the initial pressure acting on the first valve 80 from the valve spring 81 by using the adjusting sleeve 49, valve case 47, first and second adjusting rods 84 and 86 and adjusting nut 83. It is thus possible to permit adjustment of the attenuating force in both the contraction and elongation strokes of the front fork 10 as a whole without complicating the construction of the attenuating mechanisms 70 and 59 of the left and fight side front fork assemblies 11. It is thereby, possible to suitably satisfy the various tastes of different bicycle riders.

Further, since the piston 71 and first and second valves 80 and 76, in the attenuating mechanism 70 of the left side front fork assembly 11 are the same in shape, respectively, with the piston 33 and first and second valves 43 and 39, in the attenuating mechanism 59 of the right side front fork assembly 11, it is possible to use common parts for the two attenuating mechanisms 70 and 59, thus permitting cost reduction.

While in the above embodiment the invention is applied to the front fork 10, it is applicable to the rear fork as well. Further, it is applicable to an inverted front fork.

As has been shown, with the bicycle front wheel suspension according to the invention, it is possible to provide for the adjustment of attenuating force during the elongation and contraction of the wheel suspension without unduly complicating the construction of the attenuating mechanisms.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can fall within a scope encompassed and equivalents thereof with respect to the feature set out in the appended claims.

What is claimed is:

1. A bicycle wheel fork assembly having a cross member and a steering bracket, and capable of contraction and elongation, the fork assembly comprising:

a first inner tube slidably coupled to a first outer tube, the first inner and outer tubes capable of elongation and contraction in relation to each other, the first inner tube and the first outer tube including means for adjusting attenuation of contraction; and a second inner tube slidably coupled to a second outer tube, the second inner and outer tubes capable of elongation and contraction in relation to each other, the second inner tube and second outer tube including means for adjusting attenuation of elongation, the first and second inner tubes are rigidly coupled by one of the cross member or the steering bracket, and the first and second outer tubes are rigidly coupled by the other of the cross member or the steering bracket, wherein the inner tubes are capable of contracting and elongating in relation to the respective outer tubes in unison, wherein attenuation of contraction of the fork assembly is adjustable only by the means for adjusting attenuation of contraction of the first inner tube and first outer tube, and attenuation of elongation of the fork assembly is adjustable only by the means for adjusting attenuation of elongation of the second inner tube and second outer tube.

2. The bicycle wheel fork assembly according to claim 1, wherein the means for adjusting attenuation of contraction comprises a first piston and a first valve coupled to the first inner tube and disposed in an oil chamber of the first inner and first outer tubes, and the means for adjusting attenuation of elongation comprises a second piston and a second valve coupled to the second inner tube and disposed in an oil chamber of the second inner and second outer tubes.

3. The bicycle wheel fork assembly according to claim 2, wherein the first piston and first valve are substantially the same as the second piston and second valve, but the first piston and first valve are inverted in relation to the second piston and second valve.

4. A bicycle wheel fork assembly according to claim 1, wherein the first inner and outer tubes, and the second inner and outer tubes each further comprise:

a chamber, a bottom of the each chamber defined by a partitioning wall member, and a top of the each chamber defined by a closing member, each chamber having an oil in a lower portion of the chamber and a gas in an upper portion of the chamber; and each chamber having a piston disposed on a lower end of the corresponding inner tube, the piston separating the oil in the chamber into an upper oil chamber and a lower oil chamber, the piston having a contraction flow path and an elongation flow path.

5. A bicycle wheel fork assembly according to claim 4, wherein the piston in the chamber of the first inner and first outer tubes further comprises:

a first valve in the upper oil chamber biased against the contraction flow path of the piston, wherein, on contraction, oil from the lower oil chamber passes through the contraction flow path against the bias of the first valve, and into the upper oil chamber and compresses the gas in the upper portion of the chamber; and a second valve in the lower oil chamber biased against the elongation flow path of the piston, wherein, on elongation, oil from the upper oil chamber passes through the elongation flow path against the bias of the second valve, and into the lower oil chamber.

6. A bicycle wheel fork assembly according to claim 5, wherein the first valve is biased against the contraction flow path by a first spring, and the closing member includes an adjusting sleeve with an adjusting rod for compressing the first spring against the first valve to adjust the bias of the first valve which controls the passage of oil from the lower oil chamber to the upper oil chamber during contraction.

7. A bicycle wheel fork assembly according to claim 4, wherein the piston in the chamber of the second inner and second outer tubes further comprises:

a first valve in the lower oil chamber biased against the elongation flow path of the piston, wherein, on elongation, oil from the upper oil chamber passes through the elongation flow path against the bias of the first valve, and into the lower oil chamber: and a second valve in the upper oil chamber biased against the contraction flow path of the piston, wherein, on contraction, oil from the lower oil chamber passes through the contraction flow path against the bias of the second valve, and into the upper oil chamber and compresses the gas in the upper portion of the chamber.

8. A bicycle wheel fork assembly according to claim 7, wherein the first valve is biased against the elongation flow path by a first spring, and the closing member includes an adjusting sleeve with an adjusting rod for compressing the first spring against the first valve to adjust the bias of the first valve which controls the passage of oil from the upper oil chamber to the lower oil chamber during elongation.

9. A bicycle wheel fork assembly according to claim 4, further comprising an adjusting ring coupled to the partitioning wall member defining the bottom of the each chamber, and rotatably coupled by screw threads to an outer surface of the corresponding outer tube, wherein the adjusting ring is movable in an axial direction along the corresponding outer tube to change a position of the bottom of the chamber.

10. A bicycle wheel fork assembly according to claim 9, further comprising a scale and a pointer, wherein the scale and pointer visually indicate the relative position of the partitioning wall member defining the bottom of the chamber.

11. A bicycle wheel fork assembly according to claim 4, further comprising an orifice connecting the contraction flow path and the elongation flow path of the piston.

12. A bicycle wheel fork assembly having a cross member and a steering bracket, and capable of contraction and elongation, the fork assembly comprising:

a first inner tube slidably coupled to a first outer tube, the first inner and outer tubes capable of elongation and contraction in relation to each other and forming a first chamber having oil in a portion thereof;

a second inner tube slidably coupled to a second outer tube, the second inner and outer tubes capable of elongation and contraction in relation to each other and forming a second chamber having oil in a portion thereof, the first and second inner tubes are rigidly coupled by one of the cross member or the steering bracket, and the first and second outer tubes are rigidly coupled by the other of the cross member or the steering bracket, the inner tubes are capable of contraction and elongation in relation to the respective outer tubes in unison;

a first piston coupled to the first inner tube and disposed in the oil of the first chamber, the first piston having a contraction attenuating valve on an upper portion of the first piston and an elongation attenuating valve on a lower portion of the first piston;

means for adjusting the contraction attenuating valve on the upper portion of the first piston;

a second piston coupled to the second inner tube and disposed in the oil of the second chamber, the second piston having a contraction attenuating valve on an upper portion of the second piston and an elongation attenuating valve on a lower portion of the second piston; and means for adjusting the elongation attenuating valve on the lower portion of the second piston, wherein attenuation of contraction of the fork assembly is adjustable only by the means for adjusting contraction attenuating valve, and attenuation of elongation of the fork assembly is adjustable only by the means for adjusting the elongation attenuating valve.

13. The bicycle wheel fork assembly according to claim 12, wherein the first piston is substantially the same as the second piston, but the first piston is inverted in relation to the second piston.

* * * * *